US012679198B2

(12) United States Patent   (10) Patent No.: US 12,679,198 B2

Diedrich   (45) Date of Patent: Jul. 14, 2026

(54) FAN MODULE FOR A HEAT EXCHANGER FOR A TRANSPORTATION VEHICLE DRIVE

(71) Applicant: VOLKSWAGEN AKTIENGESELLSCHAFT, Wolfsburg (DE)

(72) Inventor: Mathias Diedrich, Lehre (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 282 days.

(21) Appl. No.: 18/316,510

(22) Filed: May 12, 2023

(65) Prior Publication Data

US 2023/0364984 A1     Nov. 16, 2023

(30) Foreign Application Priority Data

May 12, 2022   (DE) ..................... 10 2022 204 642.0

(51) Int. Cl.
*B60K 11/08*   (2006.01)
*B60H 1/00*   (2006.01)
*B60K 1/00*   (2006.01)

(52) U.S. Cl.
CPC .......... *B60K 11/08* (2013.01); *B60H 1/00328* (2013.01); *B60K 1/00* (2013.01); *B60K 2001/006* (2013.01)

(58) Field of Classification Search
CPC .... B60K 11/08; B60K 1/00; B60K 2001/006; B60H 1/00328
See application file for complete search history.

(56) References Cited

U.S. PATENT DOCUMENTS

| | | | |
|---|---|---|---|
| 4,548,548 A | 10/1985 | Gray, III | |
| 5,775,450 A | 7/1998 | Porter et al. | |
| 6,024,536 A * | 2/2000 | Tsubakida | F04D 29/386 |
| | | | 416/189 |
| 10,800,249 B2 | 10/2020 | Schaefer et al. | |
| 2006/0272800 A1 | 12/2006 | Wong et al. | |
| 2007/0224045 A1 | 9/2007 | Hong et al. | |
| 2011/0171898 A1 | 7/2011 | Berling | |
| 2017/0356673 A1 | 12/2017 | Gauss et al. | |

FOREIGN PATENT DOCUMENTS

| | | |
|---|---|---|
| DE | 3112630 A1 | 10/1982 |
| DE | 19751042 A1 | 5/1998 |
| DE | 102011121624 A1 | 6/2013 |
| DE | 102011121624 B4 | 3/2019 |

(Continued)

OTHER PUBLICATIONS

Office Action; Chinese Patent Application No. 202310526641.X; Jan. 20, 2026.

*Primary Examiner* — Erez Gurari

(74) *Attorney, Agent, or Firm* — BARNES & THORNBURG LLP

(57) ABSTRACT

A fan module for a heat exchanger for a drive of a transportation vehicle. The fan module includes at least one of the guide vanes imposing on the flow of the air delivered by the respective fan wheel, an orientation having a first vector component in the cross direction to the delivery direction and a second vector component in the delivery direction, the first vector component being greater than the second vector component.

10 Claims, 3 Drawing Sheets

(56) References Cited

FOREIGN PATENT DOCUMENTS

| | | | |
|---|---|---|---|
| DE | 102018214782 | A1 | 3/2020 |
| EP | 0979745 | A1 | 2/2000 |
| EP | 1387053 | A1 | 2/2004 |
| EP | 1890019 | A1 | 2/2008 |
| EP | 3617529 | A1 | 3/2020 |
| JP | 2006341683 | A | 12/2006 |
| JP | 2009197593 | A | 9/2009 |
| KR | 20180093283 | A | 8/2018 |

* cited by examiner

FAN MODULE FOR A HEAT EXCHANGER FOR A TRANSPORTATION VEHICLE DRIVE

PRIORITY CLAIM

This patent application claims priority to German Patent Application No. 10 2022 204 642.0, filed 12 May 2022, the disclosure of which is incorporated herein by reference in its entirety.

SUMMARY

Illustrative embodiments relate to a fan module for a heat exchanger for a drive of a transportation vehicle.

Illustrative embodiments relate to a fan module for a heat exchanger for a drive of a transportation vehicle, comprising at least the following components: at least one fan wheel for delivering air in a predetermined delivery direction; a frame for connection to a heat exchanger and for accommodating the at least one fan wheel; and in the delivery direction behind at least one of the fan wheels, a guiding device having at least one guide vane for orienting the flow of the air delivered by the particular fan wheel.

BRIEF DESCRIPTION OF THE DRAWINGS

Disclosed embodiments are explained in more detail below with reference to the drawings, in which.

DETAILED DESCRIPTION

Figure 1:
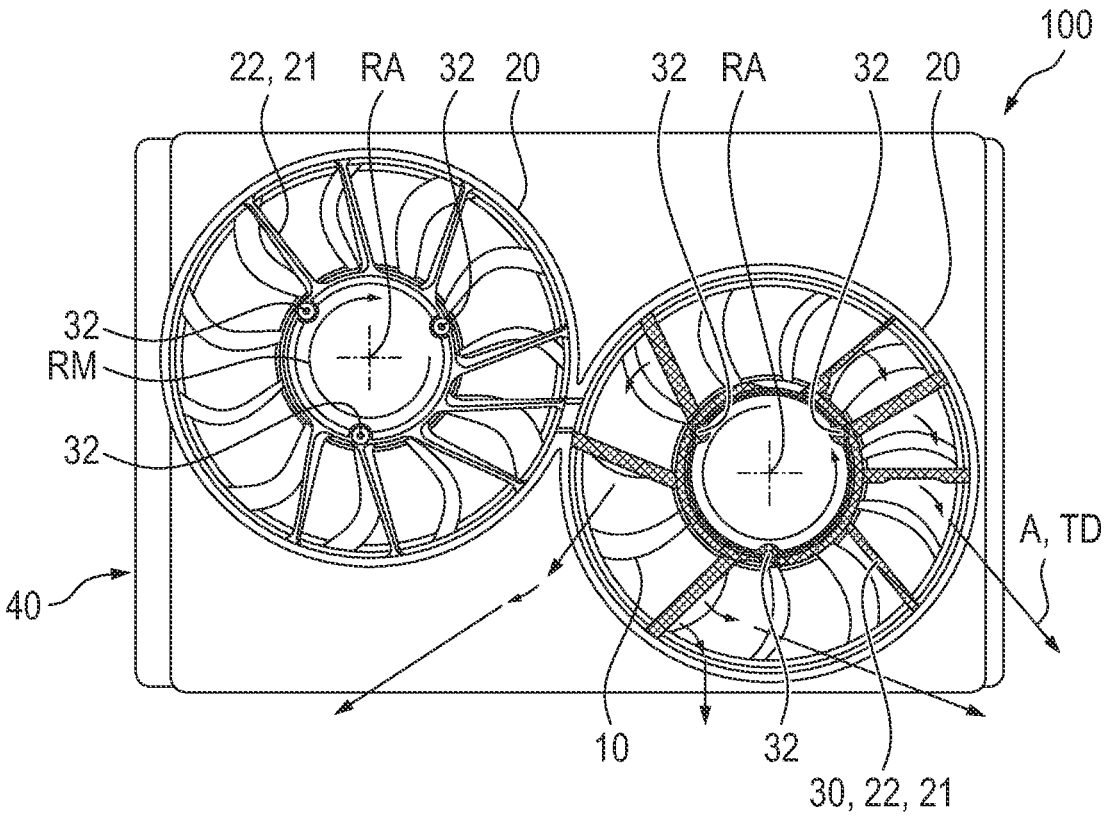
FIG. 1 shows a front view of a fan module with a guiding device.

Fan modules are known from the prior art for use in the drives of transportation vehicles, wherein these usually have at least one fan wheel for delivering air across a heat exchanger and they are used actively, for example, as a safety measure during standstill of a transportation vehicle. Due to the downsizing of engines, a constantly increasing rotary speed and power in a small available design space results. A similar problem occurs with electric traction machines, which although having less waste heat in relation to their power, nevertheless need to be kept at a distinctly low temperature level. If the temperature increases unacceptably high within the drive, damage to the drive is possible.

For example, a cooling module with an air guide unit is known from KR 2018 0 093 283 A, where the air guide unit is arranged on a fan shroud assembly. Furthermore, a guiding piece is known, which guides a flow pathway of the incoming air during operation in a transportation vehicle such that the air entering the cooling module is directed specifically by the air guide unit inside the fan shroud assembly.

Furthermore, there is known from DE 31 12 630 A1 a cooling device for a liquid-cooled internal combustion engine situated in an engine compartment of a transportation vehicle, where the cooling device comprises an axial blower connected after the internal combustion engine. Moreover, it is known from page 4 that the cooling device in addition comprises a cooling air duct, which is divided into a cold air inlet and a cold air outlet. The axial blower arranged therein comprises an impeller similar to a turbine wheel, outfitted with blades, and a guide wheel attached firmly to the housing is situated in front of the impeller. The guide walls of the guide wheel are arranged such that their inclination corresponds to the blades of the impeller. Furthermore, the blades are curved in opposite directions, to produce an air flow running substantially parallel to the axis of the axial blower.

Moreover, a cooling device with an internal combustion engine is known from the abstract of EP 1 890 019 A1, where the cooling device comprises at least one heat exchanger, a fan, and an air guiding device having at least one bypass opening controllable by a back pressure valve for a transportation vehicle having a subfloor region. Moreover, it is known from paragraph [0009] that the air guiding device stands in fluidic communication by one or more air ducts with the subfloor region of the transportation vehicle, so that upon reaching a certain travel speed a low pressure region is formed, thereby producing a suction, resulting in a premature opening of the back pressure valve, which is located in the air duct. With the back pressure valve opened, owing to the higher pressure gradient between the back pressure in the fan shroud and the low pressure in the subfloor region, a higher cooling air flow rate through the heat exchanger results.

The disclosed embodiments are based on the problem, as compared to already known fan modules, of solving the following problem with the most simple and economical method or mechanism.

Given unfavorable design space conditions (primarily for machine units installed transversely to the main travel direction), at high air mass flows it may happen that too much air flows against the machine unit situated directly to the rear, rebounds from it, increases the pressure loss and flows backward. A stalling may even occur at the wing blades of the fan wheel. A stalling method or mechanism that the fan wheel loses some or all of its effect (depending on the velocity, the actuation, and other factors).

Furthermore, the subfloors of current transportation vehicles are very well encapsulated to achieve a rather low cw value. Unfortunately, the encapsulation of the subfloor also means that the exhaust air of the fan wheel cannot flow away directly, which in turn leads to increased pressure losses. In most current transportation vehicles, there is no room available for exhaust air ducts, similar to the inlet side.

As claimed in claim 1, the above problem is solved in that at least one of the guide vanes imposes on the flow of the air delivered by the respective fan wheel an orientation having a first vector component in the cross direction to the delivery direction and a second vector component in the delivery direction, wherein the first vector component is greater than the second vector component.

The disclosed embodiments relate to a fan module for a heat exchanger for a drive of a transportation vehicle, comprising at least the following components:

at least one fan wheel for delivering air in a predetermined delivery direction;

a frame for connection to a heat exchanger and for accommodating the at least one fan wheel; and in the delivery direction behind at least one of the fan wheels, a guiding device having at least one guide vane for orienting the flow of the air delivered by the particular fan wheel.

The fan module is primarily distinguished in that at least one of the guide vanes imposes on the flow of the air delivered by the respective fan wheel an orientation having a first vector component in the cross direction to the delivery direction and a second vector component in the delivery direction, wherein the first vector component is greater than the second vector component.

For the fan wheels, reference is made to the above-cited publications merely for an understanding, the subject matter being incorporated here at least in this regard as part of the disclosure. A fan wheel, for example, is designed with an axial delivery direction, that is to say parallel to the axis of rotation of the fan wheel. The rotating fan blades of the fan wheel may be optimized for air in the range of −40° C. to +90° C., for example, room temperature to a good approximation, in terms of delivery rate, loudness, quiet running, and/or the like.

The frame may be a one-piece structural element for the mounting and supporting of some or all components of the fan module in a heat exchanger. The frame can be mounted separately with respect to a heat exchanger in an installation situation, for example, in an engine compartment. Alternatively, the frame can be secured directly to a heat exchanger. For example, the frame is a slender and/or streamlined structural element at least in the flow pathway for the air being delivered. For example, the frame is a cast element. For example, the frame comprises aluminum and/or plastic.

The delivery direction is, for example, adapted for the lowest possible flow resistance through a heat exchanger, for example, the delivery direction is parallel to an orientation of the fluid pathway for the air delivered through the heat exchanger, optionally the entire path, the middle path, or the path at the fan wheel side.

The guiding device is adapted to impose an orientation on the flow of the air delivered by the fan wheel. For example, in a fan wheel having an axial delivery direction, a spin component is imposed. Optionally, such a spin component is canceled out or at least significantly reduced by the guiding device.

In at least one disclosed embodiment, the fan module is situated behind a heat exchanger in the delivery direction.

It should be pointed out that the fan module or an associated heat exchanger, while usable for a traction machine, such as an internal combustion engine or an electric motor for the propulsion of a transportation vehicle, can also be used for other components, optionally those of a drive for the propulsion of a transportation vehicle, such as a transmission, a battery, or a power electronics.

In at least one disclosed embodiment of the fan module, one such guide vane of the guiding device comprises a first blade section and a second blade section for imposing an orientation on the flow, wherein the first blade section is adapted to reduce the spin of the flow of the delivered air that is induced by the respective fan wheel.

In at least one disclosed embodiment, the two blade sections for at least one, optionally for all, of the guide vanes are formed as a single piece with each other. In an alternative exemplary embodiment, the two blade sections for at least one, optionally for all, of the guide vanes are formed separately from each other. In at least one disclosed embodiment, the first blade section has a conventional design, at least functionally.

In at least one disclosed embodiment of the fan module, the guiding device comprises a guiding element separate from the frame.

In at least one disclosed embodiment of the fan module, the guiding element is fixed by a central mounting of the frame.

In at least one disclosed embodiment of the fan module, at least one of the guide vanes is designed according to at least one exemplary embodiment of the preceding description, wherein the first blade section forms a single piece with the frame and the second blade section forms a single piece with the guiding element.

The guiding element is, for example, a slender and/or streamlined structural element at least in the flow path for the air being delivered. For example, the frame is a cast element. For example, the frame comprises aluminum and/or plastic. Optionally, the guiding element is a retrofit element, and during a testing for a first-time operation of the fan module a decision will be made whether to install a guiding element based on the specific installation situation. The decision will be made, for example, depending on a back pressure level and/or a stalling which is found. Alternatively or additionally, the guiding element can be used in existing models as a retrofit component.

In at least one disclosed embodiment of the fan module, the respective orientations imposed on the flow by a plurality of guide vanes are different from each other.

For the lowest possible flow resistance in this exemplary embodiment, the flow orientation will be fanned out as much as possible, so that stalling effects due to compression are avoided, and optionally, a diffusor is formed for the flow oriented, for example, axially in the delivery direction, upstream from the guide vanes, optionally upstream from the second blade section. In at least one disclosed embodiment, a portion of the volume flow is directed downward with a newly imposed larger first vector component, a volume flow portion is directed to the left, and a volume flow portion is directed to the right, and/or further volume flow portions having vector components of the first vector component are directed in two of the mentioned directions crosswise to the delivery direction.

According to a further exemplary embodiment, a transportation vehicle is proposed, which comprises at least the following components:

a drive for generating a propulsive torque;

an engine compartment for accommodating at least part of the drive;

at least one driving wheel, by which the propulsive torque of the drive can be transformed into a propulsion of the transportation vehicle;

at least one heat exchanger for temperature control of at least part of the drive;

at least one fan module according to at least one disclosed embodiment of the preceding description for delivering air through the at least one heat exchanger.

The drive for the propulsion of the transportation vehicle comprises a traction machine, especially an internal combustion engine and/or at least one electric drive machine, and optionally also a traction battery, a transmission, a differential and/or other elements.

In at least one disclosed embodiment of the transportation vehicle, the delivery direction of the at least one fan wheel of the fan module is opposite the main travel direction of the transportation vehicle.

In at least one disclosed embodiment of the transportation vehicle, the engine compartment is encapsulated, wherein a minimum distance between at least one of the fan wheels of the fan module and a directly adjacent machine unit is less than 5 cm, optionally less than 3 cm.

FIG. 1 shows a fan module 100 having a guiding device 21 in a front view. The fan module 100 in this exemplary embodiment comprises a first fan wheel 10 and a second fan wheel 11, which are adapted to deliver air A in a predetermined delivery direction TD. The delivery direction TD here is axially oriented, i.e., parallel to the axis of rotation RA of the respective fan wheel 10, 11, oriented here perpendicular to the plane of the drawing. The fan wheels 10, 11 during the delivery of the air A induce a spin RM (indicated, for example, for the second fan wheel 11) within the air A being delivered, as a result of receiving the rotary impulse. A flow containing spin can only be conducted in limited manner along a delivery direction TD, so that each time a guiding device 21 is arranged here at the fan wheels 10, 11. The guiding device 21 is designed to reduce the spin RM.

The fan wheels 10, 11 here are, purely optionally, received in a common, one-piece frame 20, the frame 20 being adapted for connection to a heat exchanger 40, besides holding the fan wheels 10, 11. This is not shown here, compare for this FIG. 2 and/or FIG. 5. In an alternative exemplary embodiment, a separate frame 20 is provided for each fan wheel 10, 11 and/or the frame 20 is multi-part. Furthermore, the frame 20 comprises at least one part of the guiding device 21, namely the first blade section 23 here, and/or is adapted to accommodate the entire guiding device 21, or another part, namely the separate guiding element 30 here, of the guiding device 21. The guiding element 30 in this disclosed embodiment is fixed by a mounting 32 on the frame 20. In this exemplary embodiment, the guiding element 30 is fixed by three mountings 32 on the frame 20. The mounting 32, for example, is designed as a screw fastener, a rivet, a gluing, or a weld seam, and in this exemplary embodiment the mounting 32 is designed as a clip. The guiding device 21 comprises, purely optionally here, a plurality of guide vanes 22 with a first blade section 23, here being part of the frame 20. For details, compare FIG. 2. Furthermore, the guiding device 21 encompasses, purely optionally here, a plurality of guide vanes 22 with a second blade section 31, here purely optionally being part of a separate guiding element 30. It should be noted that not necessarily all guide vanes 22 have both a first blade section 23 and a second blade section 31. Optionally, all guide vanes 22 have at least a first blade section 23.

At least one of the guide vanes 22 or, at least definitively here, the respective first blade section 23 is adapted to compel an orientation of the flow along the delivery direction TD and thereby reduce the spin RM. At least one of the guide vanes 22 or, at least definitively here, the respective second blade section 31, is adapted to compel an orientation of the flow crosswise to the delivery direction TD.

The guide vanes 22 with the second blade section 31 are oriented such that they deliver the flow or the delivery direction TD of the air A with the largest possible first vector component V1, i.e., crosswise to the delivery direction TD, and furthermore with the most diffuse and the most direct path away from the fan module 100, as a result of the orientations differing from each other, indicated here schematically by arrows at the first fan wheel 10. A remaining volume flow along the delivery direction of the first fan wheel 10, i.e., parallel to the axis of rotation RA, is thus small. A back pressure created as a result of a nearby wall (not illustrated here) of an adjacent structural unit is thereby reduced and a resulting stalling at the fan blades of the first fan wheel 10 is practically ruled out. Such a nearby wall is, for example, a structural unit secured to a machine unit or an auxiliary unit 55 (generator, oil separator, pipes, etc.). Such a nearby wall is, for example, spaced at least 3 cm away from the first fan wheel 10 at the exit side. For details about this, compare FIG. 2 and FIG. 3.

Figure 2:
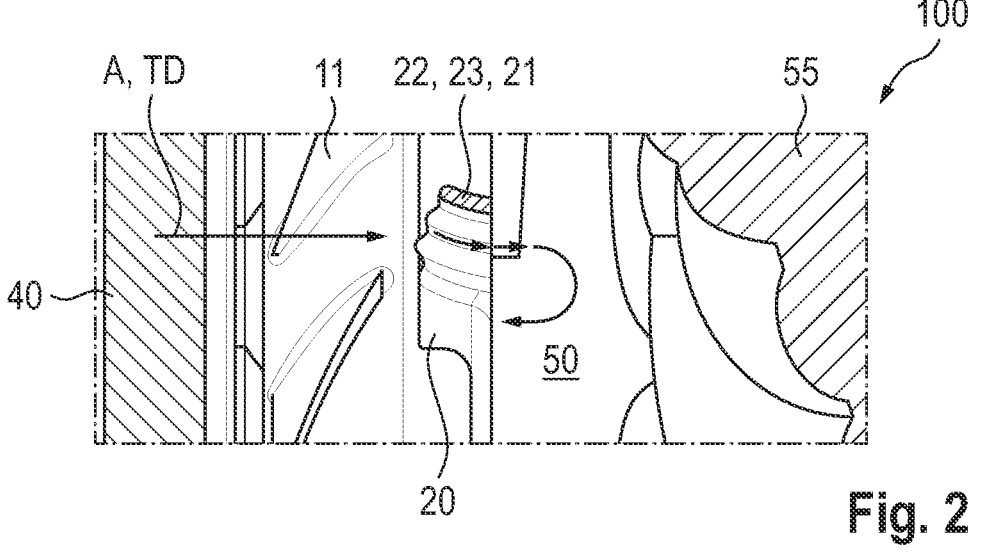
FIG. 2 shows a detailed sectional view of the fan module of FIG. 1 with the second fan wheel.

FIG. 2 shows the fan module 100 with the second fan wheel 11 per FIG. 1 in a detailed sectional view, where the sectioning line, offset parallel to the axis of rotation RA as shown in FIG. 1, is led through a fan blade of the second fan wheel 11 and an associated guide vane 22 of the guiding device 21. The second fan wheel 11 delivers air A along a delivery direction TD from a heat exchanger 40, which is situated at the left side of the drawing and which puts out hot air A to an engine compartment 50 in a main operating state. The orientation of the flow is from the fan module 100 to an immediately adjacent machine unit, such as the motor 52 or its encapsulation 56 or other mounted parts 55, which lessens the swirling caused in a transportation vehicle 200 during its operation, i.e., has a positive effect on the cW value, but also produces a thermal insulation and restricts the design space. The guiding device 21 is arranged behind the second fan wheel 11 in the flow direction, and the guiding device 21 comprises a plurality of guide vanes 22. The guide vanes 22, which are here formed as a single piece with the frame 20, have in this exemplary embodiment only a first blade section 23, wherein the (first) blade section 23 imposes on the flow of the (hot) air A an orientation away from direct impinging on the rearward components 55 and only reduces or abolishes an induced spin RM. Thus, a flow jam or a heat buildup and thus power losses of the drive 51 occur at the very nearby wall, which is formed here by the rearward components 55. Also, as shown, a reversal of the orientation is possible, which can produce a stalling at the fan blades of the second fan wheel 11, and thus an ineffectiveness. For example, the wall here is at a distance of only 3 cm to 5 cm from the second fan wheel 11 at the exit side.

In this exemplary embodiment, the guide vanes 22 or the first blade section 23 are designed only to reduce the spin RM, as indicated in FIG. 1, and to orient the flow in the delivery direction TD with the least possible spin component.

Figure 3:
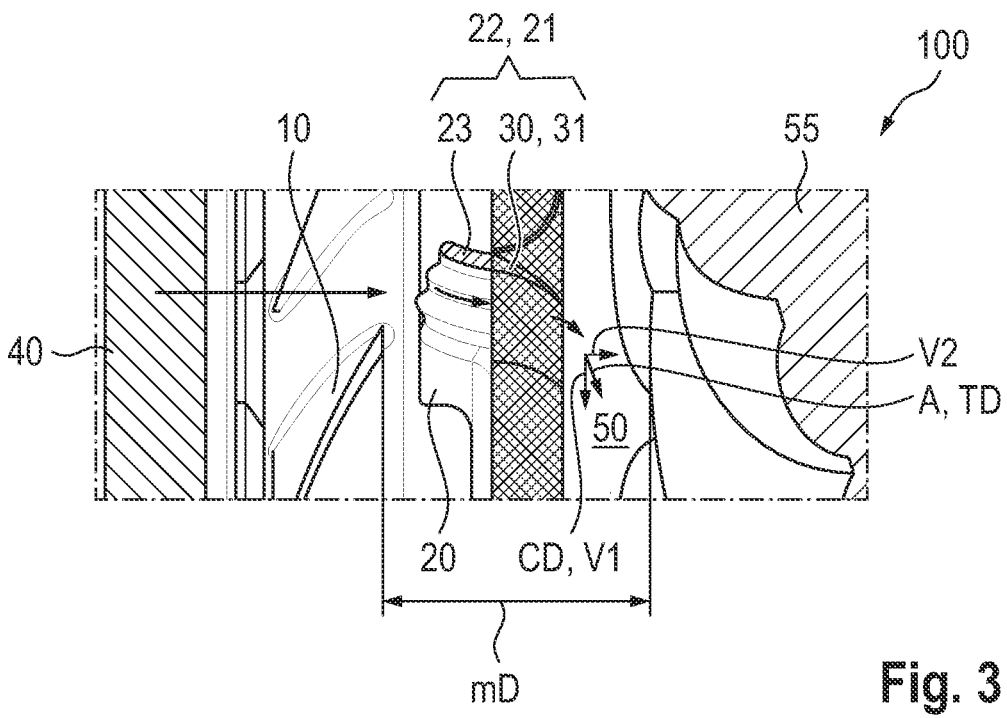
FIG. 3 shows a detailed sectional view of the fan module of FIG. 1 with the first fan wheel.

FIG. 3 shows the fan module 100 with the first fan wheel 10 per FIG. 1 and FIG. 2 in a detailed sectional view. The exemplary embodiment shown differs from FIG. 2, without ruling out the generality and purely for illustration, only in that the guiding device 21 in addition has a guiding element 30 which is separate from the frame 20, purely optionally, and the guide vanes 22 comprise in addition to the first blade section 23 also a second blade section 31. For the first blade section 23 and the function of the fan wheel 10, refer therefore to the preceding description. The second blade section 31 in the drawing is arranged to the right of the first blade section 23. In this exemplary embodiment, the guide vanes 22 are two-piece, while the first blade section 23 is formed purely optionally as a single piece with the frame 20 and the second blade section 31 is formed as a single piece with the guiding element 30. The guiding element 30 with the second blade section 31 is arranged here immediately adjacent to the first blade section 23, so that no stalling occurs at the point of contact of the blade sections 23, 31, and optionally, a perturbation-free flow transition is created. The purpose of the second blade section 31 is to impose on the flow of the air A delivered from the first fan wheel 10 an orientation crosswise to the delivery direction TD, so that a portion of the volume flow which flows against the rearward components 55 is significantly diminished. The rearward components 55, which form here the wall of the immediately adjacent machine unit, namely the motor 52, have a minimum distance mD here at the exit side from the first fan wheel 10, for example, 3 cm to a maximum of 5 cm.

The delivery direction TD here can be divided into two vector components V1, V2 in a polar coordinates system in the axis of rotation RA of the first fan wheel 10, the second vector component V2 being oriented parallel to the axis of rotation RA, i.e., axially, and the first vector component V1 being oriented crosswise to this, i.e., in the cross direction CD, according to the drawing. The first vector component V1 is thus oriented in the radial direction, i.e., inward or outward, and/or in the circumferential direction or tangentially. Because of the plane of the drawing, the tangential vector component of the first vector component V1 is represented here. Likewise, by itself or optionally furthermore, a vector component of the first vector component V1 is directed radially, optionally outward. This creates an increased running length over the guide vane 22 as compared to an exemplary embodiment as shown in FIG. 2. In this way, a gentle imposing of a flow orientation can be achieved, as shown, so that the first vector component V1, i.e., in the cross direction CD, is greater than the second vector component V2, i.e., in the delivery direction TD. This produces a resultant for the delivery direction TD of the flow which is oriented even parallel to the immediately adjacent wall, namely the rearward components 55 or the motor 52 in this case. Thus, a boosting of the power of the fan module 100 in a very cramped engine compartment 50 is feasible, without provoking a high back pressure or even a stalling across the first fan wheel 10.

Figure 4:
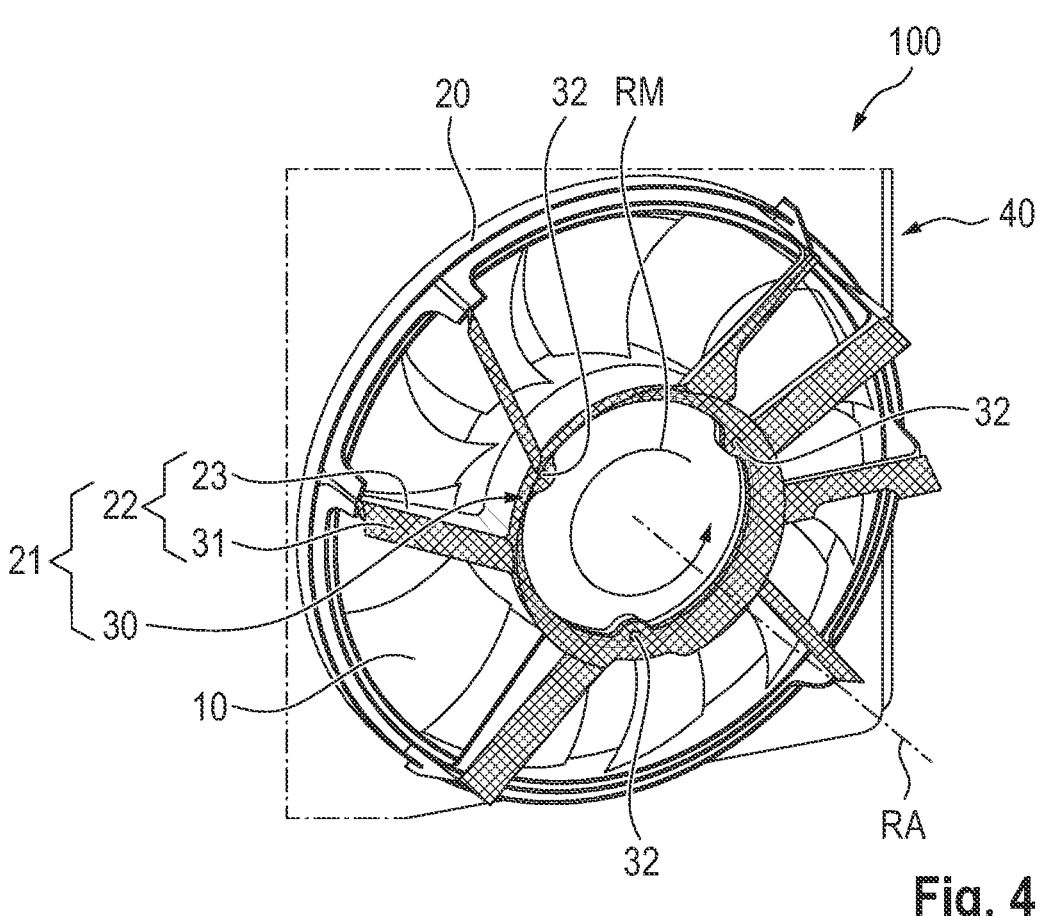
FIG. 4 shows a perspective detailed view of the fan module of FIG. 1 with the first fan wheel.

FIG. 4 shows the fan module 100 with the first fan wheel 10 per FIG. 1 and FIG. 3 in a perspective detail view, where the two-piece guide vanes 22 are especially recognizable in this illustration. Purely optionally here, each guide vane 22 in the guiding device 21 comprises a first blade section 23 and a second blade section 31, in this exemplary embodiment the first blade section 23 being formed as a single piece with the frame 20 and the second blade section 31 as a single piece with the guiding element 30. For this, the guiding element 30 is situated in immediate contact with the first blade section 23 and fixed on the frame 20 by three separate points of a mounting 32, so that a streamlined, uninterrupted, optionally steady running surface of the guide vanes 22 is formed.

One can likewise notice here the guiding device 21, which in this exemplary embodiment comprises, for the first fan wheel 10, the guiding element 30 with the second blade section 31 and the first blade section 23, which is formed as a single piece with the frame 20.

Figure 5:
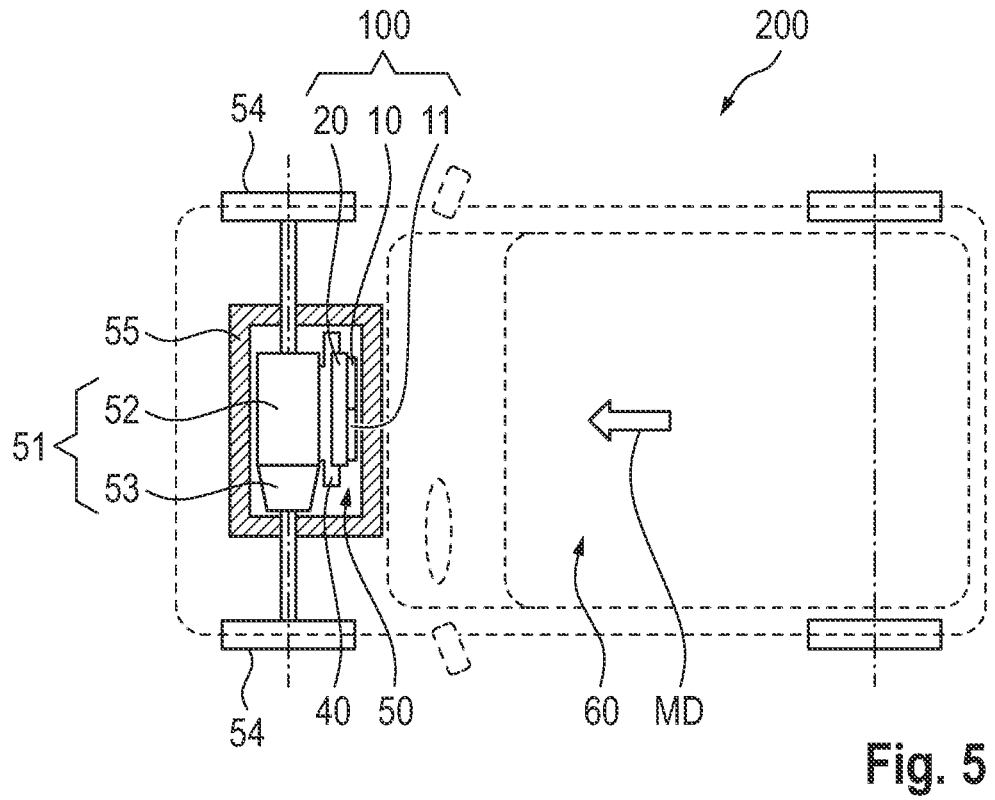
FIG. 5 shows a transportation vehicle having an engine compartment.

FIG. 5 shows a transportation vehicle 200 having an engine compartment 50 in a schematic top view, the engine compartment 50 or a portion thereof being encapsulated. Within the engine compartment 50 there is arranged a drive 51, the drive 51 in this exemplary embodiment being designed as a motor 52, for example, an electric traction machine, and comprising a transmission 53. It should be pointed out that the drive 51 encompasses further components such as a battery and/or a differential, which are not shown here, and these components are not necessarily arranged inside the encapsulation 56. The encapsulation 56 is arranged surrounding the engine compartment 50 for a beneficial cW value of the transportation vehicle 200, and it necessarily possesses a high fluidic tightness and good thermal insulating properties. The drive 51 is adapted to generate a propulsive torque, the propulsive torque placing two driving wheels 54 in rotation across the axle and thus the propulsive torque is transmitted to the running ground, so that the transportation vehicle 200 can be driven along a main travel direction MD, and optionally, also in the opposite direction. The drive 51 generates waste heat, which must be transported away from the motor 52. This heat transport occurs by a heat exchanger 40, which stands in fluidic contact with the motor 52 of the drive 51. The heat exchanger 40 is adapted to control the temperature of the motor 52, and a fan module 100 is employed to increase the convection through the heat exchanger 40 as well as to avoid a heat buildup inside the insulated engine compartment 50. The fan module 100 is adapted to deliver the air A through the heat exchanger 40 and it may be designed as described above with corresponding guide vanes 22.

LIST OF REFERENCE NUMBERS

100 Fan module
200 Transportation vehicle
10 First fan wheel
11 Second fan wheel
20 Frame
21 Guiding device
22 Guide vane
23 First blade section
30 Guiding element
31 Second blade section
32 Mounting
40 Heat exchanger
50 Engine compartment
51 Drive
52 Motor
53 Transmission
54 Driving wheel
55 Rearward components
56 Encapsulation
60 Driver compartment
A Air
CD Cross direction
MD Main travel direction
mD Minimum distance
RA Axis of rotation
RM Spin
TD Delivery direction
V1 First vector component
V2 Second vector component

The invention claimed is:

1. A fan module for a heat exchanger for a drive of a transportation vehicle, the fan module comprising at least the following components:

at least one fan wheel for delivering air in a predetermined delivery direction;

a frame for connection to a heat exchanger and for accommodating the at least one fan wheel; and positioned in the delivery direction behind at least one of the fan wheel, a guiding device having at least one guide vane for orienting the flow of the air delivered by the particular fan wheel, wherein at least one of the guiding device imposes, on the flow of the air delivered by the respective fan wheel, an orientation having a first vector component in the cross direction to the delivery direction and a second vector component in the delivery direction, wherein the first vector component is greater than the second vector component, wherein the at least one guide vane of the at least one guiding device comprises a first blade section and a second blade section for imposing an orientation on the flow, wherein the first blade section reduces the spin of the flow of the delivered air that is induced by the respective fan wheel,

9

10 wherein the at least one guiding device further comprises a guiding element separate from the frame, wherein the first blade section forms a single piece with the frame and the second blade section forms a single piece with the guiding element, and wherein the respective orientations imposed on the flow by a plurality of guide vanes are different from each other.

2. The fan module of claim 1, wherein the guiding element is fixed by a central mounting of the frame.

3. The fan module of claim 1, wherein the delivery direction of the respective fan wheel is opposite a main travel direction of the transportation vehicle.

4. The fan module of claim 1, wherein the fan module is configured to be encapsulated with an engine compartment housing at least part of the drive, wherein the configuration of the fan module provides a minimum distance between at least one of the fan wheels of the fan module and a directly adjacent machine unit that is less than 5 cm.

5. The fan module of claim 4, wherein the directly adjacent machine unit is a motor or motor unit component.

6. A transportation vehicle comprising:

a drive for generating a propulsive torque;

an engine compartment for accommodating at least part of the drive;

at least one driving wheel by which the propulsive torque of the drive is transformed into a propulsion of the transportation vehicle;

at least one heat exchanger for temperature control of at least part of the drive; and at least one fan module for delivering air through the at least one heat exchanger, wherein the at least one fan module including at least one fan wheel for delivering air in a predetermined delivery direction, a frame for connection to the at least one heat exchanger and for accommodating the at least one fan wheel, and positioned in the delivery direction behind at least one of the fan wheel, a guiding device having at least one guide vane for orienting the flow of the air delivered by the particular fan wheel, wherein at least one of the guiding device imposes, on the flow of the air delivered by the respective fan wheel, an orientation having a first vector component in the cross direction to the delivery direction and a second vector component in the delivery direction, wherein the first vector component is greater than the second vector component, wherein the at least one guide vane of the at least one guiding device comprises a first blade section and a second blade section for imposing an orientation on the flow, wherein the first blade section reduces the spin of the flow of the delivered air that is induced by the respective fan wheel, wherein the at least one guiding device further comprises a guiding element separate from the frame, wherein the first blade section forms a single piece with the frame and the second blade section forms a single piece with the guiding element, and wherein the respective orientations imposed on the flow by a plurality of guide vanes are different from each other.

7. The transportation vehicle of claim 6, wherein the delivery direction of the at least one fan wheel of the fan module is opposite the main travel direction of the transportation vehicle.

8. The transportation vehicle of claim 6, wherein the engine compartment is encapsulated, wherein a minimum distance between at least one of the fan wheels of the fan module and a directly adjacent machine unit is less than 5 cm.

9. The transportation vehicle of claim 8, wherein the directly adjacent machine unit is a motor or motor unit components.

10. The transportation vehicle of claim 6, wherein the guiding element is fixed by a central mounting of the frame.

* * * * *